Figure 1:
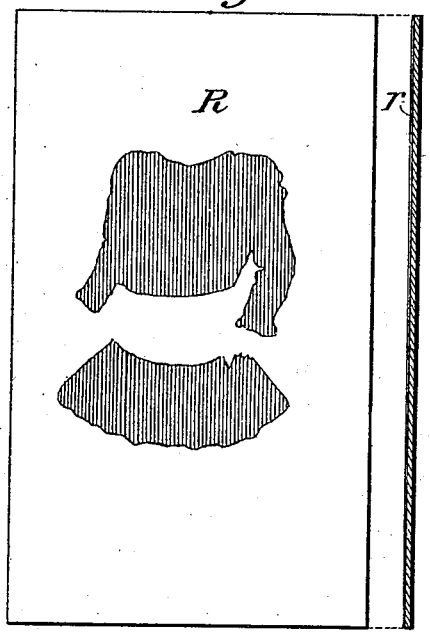

No. 711,875. Patented Oct. 21, 1902.
M. & H. M. MILEY.
COLOR PHOTOGRAPH AND ART OF MAKING SAME.
(Application filed Mar. 31, 1902.)
(No Model.)

UNITED STATES PATENT OFFICE.

MICHAEL MILEY AND HENRY MACKEY MILEY, OF LEXINGTON, VIRGINIA, ASSIGNORS TO MILEY COLOUR PHOTOGRAPH COMPANY, OF NEW YORK, N. Y.

COLOR PHOTOGRAPH AND ART OF MAKING SAME.

SPECIFICATION forming part of Letters Patent No. 711,875, dated October 21, 1902.

Application filed March 31, 1902. Serial No. 100,824. (No specimens.)

*To all whom it may concern:*

Be it known that we, MICHAEL MILEY and HENRY MACKEY MILEY, citizens of the United States, and residents of Lexington, in the county of Rockbridge and State of Virginia, have invented a new and useful Improvement in Color Photographs, of which the following is a specification.

Our invention relates to color photography; and it consists in the product and process hereinafter described.

In carrying out our process we proceed as follows: Negatives are made by the tricolor process, using three sensitized plates and three screens, the screens being red, green, and violet, respectively, and the coloring-matter of each screen being placed between thin glass. Such screens can be procured from photographic-supply houses. These screens are manufactured with the greatest care, with the idea of representing as near as possible the primary-color areas of the photographed object. Care should be taken to select only those screens which have been tested for color value and guaranteed.

With the red screen an orthochromatic plate flowed with a cyanin solution is used. With the green screen an orthochromatic plate is used, and with the violet screen a plain gelatino-silver-bromid plate is used. Detailed explanation of this step is unnecessary, inasmuch as the photographic-supply houses which furnish the color screens furnish also full directions in regard to the preparation of plates used in connection therewith and time of exposure. After exposure, the plates being developed, we have three negatives—one through the red screen, one through the green screen, and one through the violet screen—varying in density in the different areas substantially in accordance with the color values of the three primary colors in the corresponding areas of the picture taken. From these negatives, taken successively through the red, green, and violet screens, prints are made by the use of bichromated gelatin-pigment paper, (carbon tissue.) Inasmuch as it is our purpose and requisite to the end we have in view—to represent the primary colors of the object photographed—great care should be exercised in selecting pigments to take only those which when tested by spectrum give a color value closely approximating the spectrum of the color—red, blue, or yellow—they represent. A pigment having ninety per cent., or even somewhat less, of the spectrum value of its primary color can be used with good results. The nearer its color value approaches the spectrum of its primary color the better. The pigment thus stands in the picture as the effective representative of its primary color in the photographed object. Another controlling consideration in the selection of the pigments is that only those should be taken that are inert as regards gelatin in the sense that they do not affect the solubility of the latter, because the object we have in view is dependent upon the relative solubility of different areas of the gelatin-pigment paper, and a pigment which in itself would tend to render the gelatin insoluble or less soluble throughout the whole area of the paper would defeat that object. By employing, however, what we have termed an "inert pigment" the solubility of the gelatin remains unaffected, and consequently the pigment color in the picture will substantially conform to the area of its primary color in the photographed object. The pigment red, pigment yellow, and pigment blue are finally ground and embedded and thoroughly mixed with soluble gelatin coated on paper and dried. These papers can be prepared and made to order in the roll by carbon-tissue manufacturers, careful attention, as before said, being given to the pigments employed.

The paper when required for use can be sensitized in a bath of about five-per-cent. solution of potassium bichromate for three minutes and dried in a dark room. The action of light in the coating thus sensitized is to render insoluble in hot water so much of the gelatin as is affected by the rays. The paper as thus prepared is ready for printing. The density of the three negatives is ascertained in any well-known way.

Using the red-screen negative we print the blue-pigment paper. From the green-screen negative the red-pigment paper is printed, and from the violet-screen negative the yellow-pigment paper is printed. We have now three gelatin-pigment papers the gelatin of which varies in solubility in the different pigment areas according to the color values in the corresponding areas of the respective three negatives just mentioned.

The development of the gelatin-pigment papers is in the following order:

*Development of the red pigment.*—A temporary support, generally a film of opaque flexible celluloid or, if preferable, glass or porcelain, is flowed with wax on one surface, and when the wax has set collodion is flowed over the wax. For the wax solution we prefer to use rosin, four drams, and beeswax, one dram, dissolved in turpentine, sixteen ounces. The collodion solution consists, preferably, of ether, eight ounces, alcohol, twelve ounces, and gun-cotton, one hundred grains. The absolute qualities of course may vary; but the proportions above stated will be found suitable for the purpose. When the collodion sets, but before it dries, the celluloid film is placed in cold water until it is required for use, the object being to maintain the collodion in adhesive condition. The red-pigment paper is soaked in cold water (58° Fahrenheit) until it becomes limp and is then squeegeed on the prepared surface of the celluloid and kept under pressure for about twenty minutes. The celluloid film and pigment-paper are then subjected to a hot-water bath at a temperature of about 100° Fahrenheit until the soluble gelatin by the action of the hot water begins to swell around the edges and exudes from between the celluloid and the paper. Beginning at one corner the paper is now stripped from the celluloid, carrying with it most of the still soluble gelatin and its contained pigment and leaving on the celluloid the light-struck gelatin, with its embedded pigments, as well as some soluble gelatin. By gentle agitation the free gelatin, together with so much pigment as it contains, is washed away. The remaining pigment accords substantially with the primary red color in the different portions of the photographed object. The insoluble gelatin, with its contained pigments, is now transferred to a piece of gelatin-coated paper, which forms the final support upon which the red, yellow, and blue pigment films are superposed, preferably in the order named. The gelatin transfer-paper is first put in cold water until it becomes limp and is then put in water having a temperature of about 70° Fahrenheit until the gelatin begins to soften. It is then taken out of the bath and applied to and pressed upon the pigment-bearing surface of the celluloid and hung up to dry. The effect of the drying is that the paper frees itself from the celluloid by contraction of the gelatin, stripping the celluloid of its prepared surface, which remains on the transfer-paper. It is most important to get rid of the wax on the surface of the pigmented gelatin now on the transfer-paper in order to insure the complete and permanent adhesion of the pigment films when superposed, as will shortly be described. The wax cannot be effectively dissolved and removed by means of alcohol, ether, benzin, or the like; but by the application and use of collodion in the manner hereinbefore specified this result can be obtained. When the transfer-paper is removed from the celluloid, we have the wax on the outermost surface of the paper, the collodion film next, and then the gelatin with its contained pigment. Now by rubbing the surface of the paper with a wash composed of equal parts of ether and alcohol the collodion is readily dissolved and removed and carries with it the wax on its surface, leaving a clean pigmented-gelatin surface.

*Development of the yellow and blue pigments.*—The development of the yellow pigment is effected in the same way, using, however, a transparent support, preferably flexible, such as transparent flexible celluloid. After development of the yellow pigment on the transparent support the latter is laid pigment-face downward upon the red-pigment face of the transparent paper, the red-pigment surface being first flowed with a gelatin solution containing a few drops of a hardening agent, such as chrome-alum—say in the proportion of ten drops of saturated solution of chrome-alum to eight ounces water and one dram gelatin. After a proper coincidence of the color areas is established (this can be determined by observation through the transparent celluloid film) a slight pressure is brought to bear and the product is hung up to dry. The drying operation separates the celluloid film from the paper, as before described, and the surface of the latter being freed from collodion and wax we now have the paper bearing two superposed primary colors—red and yellow—of the photographed object. We proceed with the development and transfer of the blue pigment in the same way as with the yellow, except that as this is the final superposed film it is only necessary to wax the surface of the transparent celluloid film or other transparent support, omitting the collodion. The transfer-paper (the final support) will now bear the superposed pigments of the three primary colors—red, yellow, blue—in the order named, constituting a perfect color picture containing a very exact reproduction of the colors of the original object.

We prefer to superpose the pigments in the order stated, although, if desired, the red may be superposed on the yellow instead of the yellow on the red; but we find that to obtain the best results it is always desirable to superpose the blue last of all.

The accompanying drawings, which depict in the finished picture a young girl wearing a red dress, a blue sash, and a yellow hat, is a diagrammatic representation of the simplest expression of the invention, and even in this it is not possible to represent the combinations of pigments to which shadings and graduations of color are due.

Figure 3:
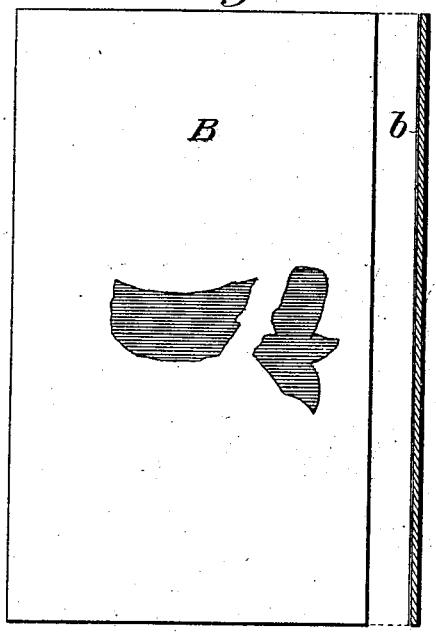
Figure 2:
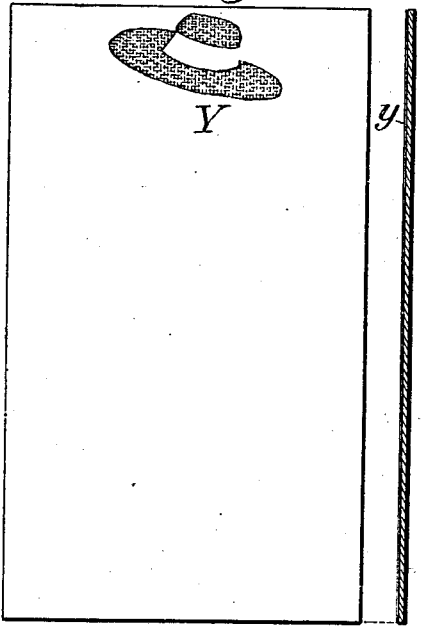
Figure 4:
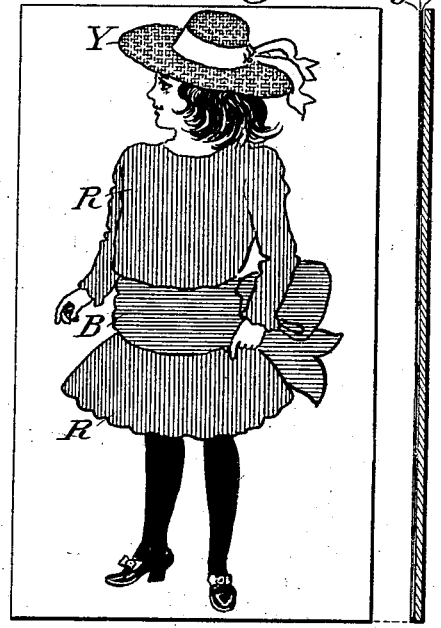

Figure 1 represents at R a face view of the red-pigmented film with the red-color area appropriately lined thereon, and at *r* an edge view of said film on its temporary support. Fig. 2 represents at Y a face view of the yellow-pigmented film with the yellow-color area appropriately hatched thereon, and at *y* an edge view of said film on its temporary support. Fig. 3 represents at B the blue-pigmented film with the blue-color area appropriately lined thereon, and *b* is an edge view of the blue film on its temporary support. Fig. 4 is a face view representing the effect produced by the superimposition of the three films having the color areas R Y B depicted in the preceding figures, and at *b y r* is represented an edge view of the three films superimposed on their permanent support.

Having described our invention and the best way now known to us of carrying the same into practical effect, what we claim herein as new and of our own invention is as follows:

1. A color photograph consisting of directly superimposed inert primary-color pigments, having substantially the same color value as, and representing and conforming to the areas of, their respective primary colors in the photographed object, substantially as set forth.

2. The process of producing accurate color photographs which consists in making pigment pictures in inert primary colors each substantially representing and conforming to the area of one of the primary colors of the photographed object, and directly superimposing said pictures, substantially as set forth.

3. The process of color photography which consists in printing from negatives by direct contact upon sensitized-pigment papers images of the primary-color areas of the same photographed object, and then directly superimposing said pigments, substantially as described.

4. The process of accurate color photography which consists in making separate pigment photographs of the same object on bichromated gelatin tissue containing inert red, yellow and blue pigments respectively, each having a color value substantially that of the primary color which it represents, and directly superimposing said pigments, substantially as described.

5. The method of facilitating the removal of the wax from the face of the pigmented gelatin film, which consists in interposing a layer of collodion between the face of the film and the wax on the surface of the temporary support to which the said film is applied during the process of development, substantially as and for the purposes hereinbefore set forth.

In testimony whereof we have hereunto set our hands this 28th day of March, 1902.

MICHAEL MILEY.
HENRY MACKEY MILEY.

Witnesses:
J. W. MOORE,
ED. T. ROBINSON.